United States Patent Office 3,462,407
Patented Aug. 19, 1969

3,462,407
PROCESS FOR REACTING DIOLEFINIC POLYMER WITH POLYHALOCYCLOPENTADIENE AND PRODUCTS THEREOF
Gilbert Witschard, Grand Island, and Claude Thomas Bean, Jr., Niagara Falls, N.Y., assignors to Hooker Chemical Corporation, Niagara Falls, N.Y., a corporation of New York
No Drawing. Filed May 28, 1965, Ser. No. 459,888
Int. Cl. C08f 27/02, 27/00
U.S. Cl. 260—94.7        7 Claims

ABSTRACT OF THE DISCLOSURE

A polymer is produced by a process which comprises (1) making an emulsion by mixing polyhalocyclopentadiene with a dihydroxylic alkylene, (2) dissolving an olefinic polymer in the emulsion, (3) heating the emulsion until the desired polymer is obtained and (4) recovering the polymer.

The polymers of this invention find use in coating compositions and as a fire retardant additive.

---

This invention relates to a new process for producing polymers from a diolefinic polymer and polyhalocyclopentadiene.

Polymers which are the reaction products of a diolefinic polymer with polyhalocyclopentadiene have been found to be useful in preparations of adhesives, coating materials and impregnation of fibers where fire retarding properties are desirable. However, the processes for preparing these polymers involve the use of solvents which must be recovered if the processes are to be efficient and economical. Among the solvents proposed for use in preparing these polymers has been a large excess of polyhalocyclopentadiene and also aromatic solvents, such as toluene, xylene, and benzene. The method of employing an excess of polyhalocyclopentadiene produces a very viscous solution which has to be exposed to air during parts of the reaction to reduce the viscosity of medium to a more reasonable or workable level. The use of aromatic solvents avoids the viscosity problem, but requires very careful control to retain the highly volatile solvents. In each case a resulting polymer must then be recovered by a complex technique. There has now been found a convenient and economical process for preparing such polymers.

In accordance with this invention, there is provided a process for preparing polymers by: (1) making an emulsion by mixing polyhalocyclopentadiene with a dihydroxylic alkylene, (2) dissolving an olefinic polymer in the emulsion, (3) heating the emulsion until the polymer is obtained and (4) recovering the polymer.

The polymers used in the practice of the invention are substantially linear unsaturated homo-polymer of diolefinic monomers such as butadiene, methyl butadiene, dimethyl butadiene, cyclohexadiene, cyclopentadiene and methylcyclopentadiene. The polymers are soluble in solvents such as benzene, toluene, xylene, chloroform, and carbon tetrachloride. The preferred polymers of the invention are the homopolymers of butadiene. Many processes are available for the preparation of such polymers, for example, by solution, emulsion and mass polymerization techniques. One such process involves polymerizing 1,3-butadiene in the presence of a catalyst composition comprising (a) an organo metal compound corresponding to the formula: $R_nM$ wherein R is an alkyl radical containing up to and including 12 carbon atoms; M is a metal selected from the group consisting of mercury and zinc; and $n$ is an integer equal to valence of the metal M; and (b) titanium tetraiodide. The polymer produced by this process contains from about 85 percent up to about 93 percent and higher cis 1,4-addition. Typical of the organo metal compound contemplated are: dimethylmercury, diethylmercury, diisobutylmercury, dihexylmercury, dimethylzinc, diethylzinc, dibutylzinc, and dioctylzinc. The amount of organo metal compound used in the catalyst composition is usually within the range of 1 to 50 moles per mole of titanium tetraiodide, while the concentration of the total catalyst composition is usually within the range of 0.05 to 10 percent by weight based on the total amount of 1,3-butadiene charged into the polymerization reactor. The polymerization of the butadiene can be carried out in a temperature range of minus 80 to 150 degrees centigrade in the presence of a hydrocarbon diluent, such as benzene, toluene, xylene, normal hexane, isooctane, normal decane, cyclohexane, methylcyclohexane and mixtures thereof. At the completion of the polymerization reaction, the catalyst is inactivated; the rubbery polymer is precipitated from the solution with an alcohol, and is then separated from the diluent by a suitable means, such as filtration. The other diolefinic polymers of the invention are produced by such catalytic processes and even in the absence of catalyst. In noncatalytic processes, more drastic conditions of temperature and pressure are employed. In the production of catalytic polymers, various types of catalyst can be employed, including organic peroxides, metal oxides and alkali metals, such as sodium. By employing various temperatures, pressures, catalysts and monomer concentrations, the properties of the reactant are varied as required by the utility of the product.

The polyhalogenated cyclopentadiene of this invention is of the formula:

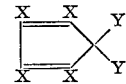

wherein X is selected from the group consisting of bromine, chlorine, and fluorine and Y is selected from the group consisting of bromine, chlorine, fluorine, alkyl and alkoxy. The aforementioned alkyl and alkoxy groups generally have from 1 to 10 carbon atoms and preferably have 1 to 16 carbon atoms. Illustrative of the polyhalogenated cyclopentadiene suitable for use in this invention are hexachlorocyclopentadiene, dichlorotetrabromocyclopentadiene, 5,5-dimethoxytetrachlorocyclopentadiene, hexabromocyclopentadiene, 5,5-difluorotetrachlorocyclopentadiene, hexafluorocyclopentadiene, 5,5 - dibromotetrachlorocyclopentadiene, methylpentachlorocyclopentadiene, 5,5 - diethoxytetrachlorocyclopentadiene, ethylpentachlorocyclopentadiene, beta - chloroethylpentachlorocyclopentadiene, propylpentachlorocyclopentadiene.

The dihydroxylic alkylenes employed in the invention generally contain from 2 to 15 carbon atoms and preferably from 2 to 6 carbon atoms. Among the more preferred dihydroxylic alkylenes are ethylene glycol, propylene glycol, 1,3-propane diol and 1,2-butylene glycol.

The diolefinic polymers of this invention are employed in a finally divided state. The polymers may be cut into small cubes, e.g., ¼ inch on a side, as crumbs or granules or as a thin sheet or rubber, i.e., sheeted or slabbed off a rubber mill at ¼ inch or less thickness.

Emulsions are substantially permanent heterogeneous liquid mixtures of two or more liquids or liquids and solids which are not normally mutually soluble in each other, but are held in suspension, one in the other, by mechanical agitation and small amounts of additional substances known as emulsifiers. It has been found advantageous in this invention to use a combination of both mechanical agitation and small amounts of emulsifiers to obtain the desired balance of properties, however, either one or both may be used within the scope of this invention. Emulsification by mechanical agitation may generally be obtained through the use of conventional emulsifying equipment. When emulsifiers are employed, the surface-active agents employed may be those such as sulfonated oils, polyhydric alcohol esters annd ethers, soaps, mahogany soaps, i.e., the sodium salts of sulfonic acids of petroleum refining sludge, sorbitan fatty acid esters and other fatty esters. The non-ionic type, such as alkyl aryl polyester alcohols are particularly useful. The foregoing enumeration is only a partial tabulation of useful anionic and nonionic surfactants which are satisfactory for use in this invention. It is often desirable to use a combination of emulsifiers so that a more stable emulsion is insured. Emulsifiers in an amount of to about 5 percent by weight of the total mixture and preferably from one quarter of one percent to three percent may be used.

The processes of this invention are carried out by charging into a reaction vessel polyhalocyclopentadiene and dihydroxylic alkylene. To this mixture may also be added emulsifiers. The mixture is then agitated until the desired emulsion is created. After the emulsion has been prepared, the finely divided parts of the diolefinic polymer are charged to the vessel. During the period in which the diolefinic polymer is being dissolved and incorporated into the emulsion, heat is applied and the emulsion is vigorously agitated. Throughout the reaction, the emulsion viscosity remains essentially unchanged. The reaction mixture is agitated, thoroughly dispersed and thereafter allowed to react.

Temperatures up to about 120 degrees centigrade may be employed to facilitate the completion of the emulsion. It is desirable that the emulsion be maintained at an elevated temperature during the period diolefinic polymer addition and its subsequent reaction with the polyhalocyclopentadiene. A suitable temperature range is from about 80 to 185 degrees centigrade and preferably from about 100 to 170 degrees centigrade.

The weight of polyhalocyclopentadiene charged per weight of dihydroxylic alkylene or glycol in the process of this invention may be varied in order to achieve a particular polymer. However, it is desirable that the weight of glycol employed to that weight of polyhalocyclopentadiene be in the ratio of 1 to about 5 pounds of glycol for each pound of polyhalocyclopentadiene.

It is an advantage of this process that it may be carried out at atmospheric or autogeneous pressure and that no vacuum is required. The reaction mixture is allowed to react at such a temperature and for such a length of time as required to achieve the degree of adduction of polyhalocyclopentadiene to the olifinic polymer. The reaction is allowed to continue for such a period as from about one half hour to about 15 hours, depending to an extent upon the exact temperature employed. Preferably, the reaction time is from about 1 to about 12 hours. It is desirable to maintain the reaction under a protective blanket of inert gas during the period of reaction. Suitable gases for use as a protective blanket include the rare gases, such as neon and helium, as well as common industrial gases, such at nitrogen.

After the reaction has proceeded to the desired degree of completion, the polymer is conveniently recovered by drawing off or decanting the supernatant liquid and dissolving the polymer in an aromatic solvent such as xylene or toluene. The polymer is then recovered from the aromatic solvent by pouring the solution into an aliphatic solvent such as an alkane or an alkanol of 1 to 20 carbon atoms. Precipitation of the reaction product out of the mixture also removes any excess polyhalocyclopentadiene which has not been reacted or previously removed from the reaction product. Thereafter, the liquids are decanted from the solid polymer. The solid polymer may then be further washed and/or dried. The polymers are conveniently dried at a temperature of about 50 to 100 degrees centigrade and under vacuum usually from 400 to 15 millimeters of mercury absolute pressure for a period of 5 to 30 minutes. Among the various aliphatic solvents suitable for use in the recovery process are isopropyl alcohol, amyl alcohol, ethyl alcohol, and the like.

The process of this invention is characterized by improvements in reactions over processes wherein solution of reactants are employed. The low viscosity of the emulsion facilitates convenient reaction, compared to the high viscosity of polymer solutions.

The invention is illustrated by the following non-limiting examples. Temperatures are expressed in degrees centigrade and parts are by weight unless otherwise indicated.

Example 1

To a reaction vessel was charged 100 parts of hexachlorocyclopentadiene, 278 parts of ethylene glycol, three parts of alkylaryl polyether alcohol (Triton X–100, Rohm and Haas) and one part of epichlorohydrin. The mixture was heated at 115 degrees centigrade and agitated until an emulsion was obtained. To the stirred emulsion was added 10 parts of cis-1,4-polybutadiene rubber in small pieces. After thirty minutes, the temperature was raised to and held at about 150 degrees centigrade for five hours, during which time a yellow viscous material formed on the sides of the reaction vessel. The cooled reaction mixture was decanted to remove the supernatant liquid and a yellow solid remaining in the flask was dissolved with toluene. The resulting solution was poured into isopropanol, the polymer precipitated and the liquids decanted from the resulting solid polymer. The purified polymer obtained (39.7 parts) contained 57.3 percent chlorine and had an adduction of 55 mole percent. The polymer had an intrinsic viscosity of 0.7 d./lg. in toluene at 30 degrees centigrade and 1.16 d./lg. in sym-tetrachloroethane at 30 degrees centigrade.

Example 2

To a reaction vessel was charged 100 parts of hexachlorocyclopentadiene, 260 parts of propylene glycol and 3 parts of an alkylaryl polyether alcohol. The charge was vigorously agitated and heated to a temperature of 115 degrees centigrade. Then, 10 parts of cis-1,4-polybutadiene rubber in small pieces were added and the mixture stirred for one hour while the temperature was maintained at 115 degrees centigrade. Thereafter, the temperature was increased to 165 degrees for five minutes whereupon a yellow rubbery material formed on the bottom of the reaction vessel. The hot supernatant liquid was decanted and the resulting polymeric material was dissolved in carbon tetrachloride. The solution was poured into isopropanol and the solid precipitate was filtered off. The solid rubbery product had a yellow color.

Example 3

To the reaction vessel was charged 278 parts of ethylene glycol, 3 grams of alkylaryl polyether alcohol and 100 parts of hexachlorocyclopentadiene. The charge was agitated vigorously and heated to 115 degrees centigrade. To the resulting emulsion, was added 10 parts of cis 1,4-polybutadiene rubber in small pieces. After 30 minutes the temperature was raised to and held at 150 degrees for two hours and large amounts of yellow solid formed inside the reaction vessel. The reaction vessel was set for distillation under reduced pressure and a total of 73 parts of hexachlorocyclopentadiene and 245 parts of ethylene glycol were distilled from the reaction mixture. The residue was dissolved in xylene and precipitated by pouring into isopropanol. The final product contained 49.4 percent chlorine for an adduction of 34 mole percent.

Example 4

To the reaction vessel was charged 172 parts of hexachlorocyclopentadiene and 245 parts of ethylene glycol. The charge was heated to about 110 degrees C. with vigorous agitation and thereafter, 34 parts of cis-1,4-polybutadiene were charged to the emulsion. The reaction temperature was then increased to 157 degrees and maintained at that temperature for 7 hours. The hard reaction product was isolated by dissolving the product in trichloroethylene and thereafter pouring the resulting mixture into an alcohol whereupon the reaction product was precipicated. The intrinsic viscosity of the product was found to be approximately 0.75 d./lg.

Similar polymers are prepared when other polyhalocyclopentadienes such as dichlorotetrabromocyclopentadiene, hexabromocyclopentadiene, dimethyltetrachlorocyclopentadienes such as dichlorotetrabromocyclopenta- are employed in the place of hexachlorocyclopentadiene of the foregoing examples.

The polymers of the foregoing examples may be conveniently massed by extruding into prills which are then suitable for dry blending with other polymers or direct use of molding equipment to make use of thermoplastic articles. The polymers of this invention when admixed with other polymers, such as polypropylene, make the resulting blend fire retardant. Also, the polymers of this invention may be dissolved in a solvent and blended with modifiers and pigments to produce useful coating compositions.

Various changes and modifications may be made in the method of this invention and in composition ratios of this invention, certain preferred forms which have been described. Equivalents may be substituted without departing from the scope of this invention and these modifications are to be regarded as within the scope thereof.

What is claimed is:

1. A process for preparing a polymer which comprises (1) making an emulsion by mixing polyhalocyclopentadiene with a dihydroxylic alkylene and mechanically agitating the mixture, (2) dissolving a substantially linear, unsaturated homopolymer of a diolefinic monomer in the emulsion, (3) heating the emulsion at a temperature from about 80 to 185 degrees centigrade until the desired polymer is obtained and (4) recovering the polymer.

2. A process for preparing a polymer which comprises (1) making an emulsion by mixing polyhalocyclopentadiene, an emulsifier and a dihydroxylic alkylene, (2) dissolving a substantially linear, unsaturated homopolymer of a diolefinic monomer in the emulsion, (3) heating the emulsion at a temperature from about 80 to 185 degrees centigrade until the desired polymer is obtained and (4) recovering the polymer.

3. A process for preparing a polymer which comprises (1) making an emulsion by mixing hexachlorocyclopentadiene with a dihydroxylic alkylene and mechanically agitating the mixture, (2) dissolving polybutadiene having at least about 85 percent of cis-1,4 configuration in the emulsion, (3) heating the emulsion at a temperature from about 80 to 185 degrees centigrade until the desired polymer is obtained and (4) recovering the polymer.

4. The process of claim 3 wherein the dihydroxylic alkylene is ethylene glycol.

5. A process for preparing a polymer which comprises (1) making an emulsion by mixing hexachlorocyclopentadiene, an emulsifier and a dihydroxylic alkylene, (2) dissolving polybutadiene having at least about 85 percent cis-1,4 configuration in the emulsion, (3) heating the emulsion at a temperature from about 80 to 185 degrees centigrade until the desired polymer is obtained and (4) recovering the polymer.

6. The process of claim 5 wherein the dihydroxylic alkylene is ethylene glycol.

7. The process of claim 5 wherein the dihydroxylic alkylene is propylene glycol.

References Cited

UNITED STATES PATENTS

| | | | |
|---|---|---|---|
| 3,098,058 | 7/1963 | Schweiker et al. | 260—94.7 |
| 3,268,475 | 8/1966 | Hoch et al. | 260—45.9 |
| 3,330,817 | 7/1967 | Rinehart | 260—94.7 |
| 2,080,558 | 5/1937 | Carothers | 260—92.3 |
| 3,325,464 | 6/1967 | Weil. | |

JAMES A. SEIDLECK, Primary Examiner

W. F. HAMROCK, Assistant Examiner

U.S. Cl. X.R.

260—93.1, 96, 879